United States Patent [19]

Tessler

[11] 3,969,341

[45] July 13, 1976

[54] METHOD FOR THE PREPARATION OF STARCH PRODUCTS AND THE COMPOUNDS UTILIZED THEREFOR AND THE PRODUCT THEREOF

[75] Inventor: Martin M. Tessler, Edison, N.J.

[73] Assignee: National Starch and Chemical Corporation, Bridgewater, N.J.

[22] Filed: Feb. 26, 1975

[21] Appl. No.: 552,890

[52] U.S. Cl. .................. 260/233.5; 260/233.3 R; 260/307 F; 260/490; 260/502.5
[51] Int. Cl.² .................................. C08B 31/02
[58] Field of Search .................. 260/233.3 R, 233.5

[56] References Cited

UNITED STATES PATENTS

| | | | |
|---|---|---|---|
| 3,720,663 | 3/1973 | Tessler | 260/233.5 |
| 3,838,149 | 9/1974 | Tessler | 260/233.5 |
| 3,842,071 | 10/1974 | Tessler | 260/233.5 |

*Primary Examiner*—Melvyn I. Marquis

[57] ABSTRACT

Modified starch products are prepared by reacting a starch, in an aqueous slurry or dispersion, with a salt of the reaction product of a 2-alkyl-2-oxazoline and phosphorus oxychloride, under controlled conditions.

11 Claims, No Drawings

METHOD FOR THE PREPARATION OF STARCH PRODUCTS AND THE COMPOUNDS UTILIZED THEREFOR AND THE PRODUCT THEREOF

BACKGROUND OF THE INVENTION

This invention relates to a method of preparing modified starch products, and, particularly, to stabilized starch products containing phosphorus and nitrogen.

While various methods of chemically modifying starch to produce modified starch products containing phosphorus have been proposed and are described in the literature, many of these methods involve dry reaction procedures. Such methods consist, for the most part, of impregnating the dry starch base with a phosphorus containing reagent solution which has a pH within a prescribed range and then heating the thusly treated starch to a particular temperature and holding it at such temperature for a certain period. For example, a representative method of the prior art for phosphorylating starch would involve impregnating starch with sodium dihydrogen phosphate (in an amount of from 2% to 4% by weight of the dry starch), at pH 4 – 8, drying the starch and heating at 120 – 130° C. for one to three hours.

Starch reactions which are carried out in aqueous media are, from a large-scale production viewpoint, more economical. However, both the wet and dry processes of the prior art are limited in the type of substituent groups with which a starch base can be modified.

It is an object of this invention to provide an efficient and economical method for preparing chemically modified starches which are characterized by their greater stability, their ability to form clearer cooked pastes which are more resistant to gelling upon cooling, and their lowered gelatinization temperatures, as compared to the corresponding untreated starches. Another object of this invention is to provide a new method for preparing starch derivatives which contain phosphorus and nitrogen groups, i.e. phosphoramidic acid groups. A further object of this invention is to provide starches modified by functional groups not heretofore used in the modification of starches by the known methods.

SUMMARY OF THE INVENTION

The above and related objects of this invention may be accomplished by reacting a selected starch base with a salt of the reaction product of a 2-alkyl-2-oxazoline, wherein the alkyl group contains from 1 to 3 carbon atoms, and phosphorus oxychloride. The starch modification is preferably carried out in an alkaline aqueous medium. The resultant modified starch product is stabilized by the presence of anionic phosphoramidic acid groups.

DETAILED DESCRIPTION OF THE PREFERRED EMBODIMENTS

The modifying agents useful in the practice of this invention are the salts of the reaction product of a 2-alkyl-2-oxazoline and phosphorus oxychloride reacted under controlled conditions. The preparation of the modifying agents is carried out by reacting a stoichiometric amount or a slight excess thereof of phosphorus oxychloride with a 2-alkyl-2-oxazoline which is in a 5–20%, by weight, alkaline aqueous solution, at a temperature of about 0°–25° C. and at a pH level of about 10.0 – 13.5 over a period of about 0.5–6 hours. During the reaction, the pH is controlled by adding 10–30% aqueous sodium hydroxide solution as required. The modifying agent is ultimately obtained in the form of an aqueous solution of about 5–16%, by weight, of the reaction product.

The exact structure of the modifying agent is not know with certainty. However, based on nuclear magnetic resonance spectroscopic analyses, the aqueous solution of the starch modifying agent is believed to consist of a mixture of the following three structures:

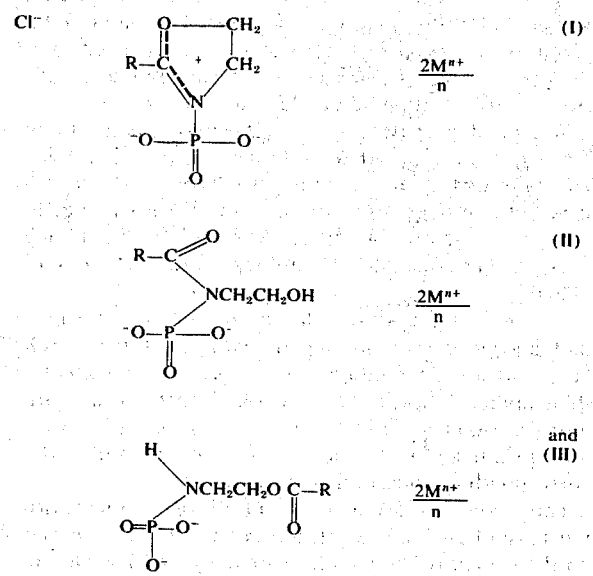

wherein R represents an alkyl group containing 1 to 3 carbon atoms, M represents a cation such as ammonium, amine, hydrogen, or an alkaline earth metal, an alkali metal, and $n$ represents the valence number of M. The broken line in structure I indicates that the charge is distributed over the oxygen, carbon, and nitrogen atoms in the ring.

Although there are three structures shown above, it is the phosphorylated oxazolinium salt indicated by structure (I) which best represents the initial dominant species and is probably the reactive species with starch. Upon being stored, as an aqueous solution, the oxazolinium salt structure represented by structure (I) showed a tendency to decompose to structure (II) which subsequently rearranges to structure (III)

The presence of the phosphoramidic group may be determined by any suitable qualitative method of analysis, e.g., infrared or nuclear magnetic resonance spectroscopy.

Additional information relating to reactions analogous to that of the 2-alkyl-2-oxazoline and phosphorus oxychloride disclosed herein may be obtained by referring to R. Greenhalgh, Canadian Journal of Chemistry, 40, 976 (1962).

The applicable starch base materials which may be used in preparing the phosphoramidic starch derivatives may be derived from any plant source including corn, potato, sweet potato, wheat, rice, sago, tapioca, waxy maize, sorghum, high amylose corn, or the like. Also included are the conversion products derived from any of the latter bases including for example, dextrines prepared by the hydrolytic action of acid and/or heat; oxidized starches prepared by treatment with oxidants such as sodium hypochlorite; derivatized starches such as starch ethers and esters; and, fluidity or thin boiling starches prepared by enzyme conversion or by mild acid hydrolysis. The use of the term "starch base" is thus seen to include any amylaceous substance, whether untreated or chemically modified which, however, still retains free hydroxyl groups capable of entering into the reaction of this invention. If the desired product is to be a granular starch then obviously the initial starting material must be in granular form. It is to be noted that the method of the invention may also be carried out employing gelatinized starches which will result in the production of non-granular starch products. When a modified base is used, it is preferred that it contain cationic substituent groups such as, for example, diethylaminoethyl groups.

A typical preparation of a phosphoramidic starch derivative, in accordance with this invention is carried out by admixing an aqueous suspension of the starch base with an aqueous solution of the modifying agent, and then reacting the starch base and the modifying agent, under controlled conditions, as set forth hereinbelow.

The resulting modified starch products are nitrogen and phosphorus containing derivatives of the starch base and are characterized by their greater stability, their ability to form clearer cooked pastes which are more resistant to gelling upon cooling, and their lowered gelatinization temperatures, as compared to the corresponding untreated starches.

The amount of modifying agent utilized to react with the starch base may vary from about 3 to 125%, based on the weight of the starch, depending on such factors as the starch base employed, the degree of modification which is desired in the end product, the particular modifying agent, i.e., whether the sodium salt or potassium salt is employed, etc., the reaction time, and the pH level. The order in which the reagents are added to form the reaction mixture is not of particular significance.

The reaction temperature may vary from 15° to 95° C. depending on the ingredients used, particularly the starch base. For example, the preferred temperature at which a granular starch modification is carried out is from about 20° to 55° C., and that for a non-granular starch modification is from about 20° to 75° C. It will be recognized by the practitioner that use of temperatures above about 60° C. will result in granule swelling and filtration difficulties or gelatinization of the starch.

The pH level at which the reaction is normally carried out may be from about 9.0 – 13.0 and preferably from 10.5 – 12.0. If it is desired to maintain a specific pH level, the pH may be controlled by the periodic addition of a base solution such as sodium hydroxide or any other suitable base, e.g., potassium hydroxide, tetramethylammonium hydroxide, sodium carbonate, etc.; or the addition of a solid base, e.g. calcium hydroxide, etc.

Reaction time will vary from about 1 to 24 hours depending on such factors as the reactivity of the reagent used, the amoung of reagent used, the temperature employed, etc.

After completion of the reaction, the pH of the reaction mixture is preferably adjusted to a pH of from about 3.0 to 7.0, using any common acid such as hydrochloric acid, sulfuric acid, acetic acid, etc. The resultant granular starch product is recovered by filtration, washed free of residual salts with water, and thereafter dried. Alternatively, the washed product may be drum dried, or spray dried, or gelatinized and isolated by alcohol precipitation or freeze drying. If the starch product is derived from a non-granular starch base, it can be purified by dialysis to remove any residual salts and then isolated by alcohol precipitation or freeze drying.

To the extent that the modifying agent may exist in one or more of the three aforementioned structures, the exact structure of the modified starches are not known with certainty. However, it is reasonable to assume that stabilization is afforded by the presence of the reagent groups bound to the starch by covalent bonds. The characteristic structure of the modified portions of the stable phosphoramidic starch derivative will depend on the actual structure of the reagent, the mechanism by which the modifier reacts with the starch and the stability of the initial starch product under the alkaline reaction conditions. For example, the modified portion of the starch may be typically represented by any one of the following general structures, i, ii, or iii, or a combination of more than one of the structures, i, ii, iii, or iv.

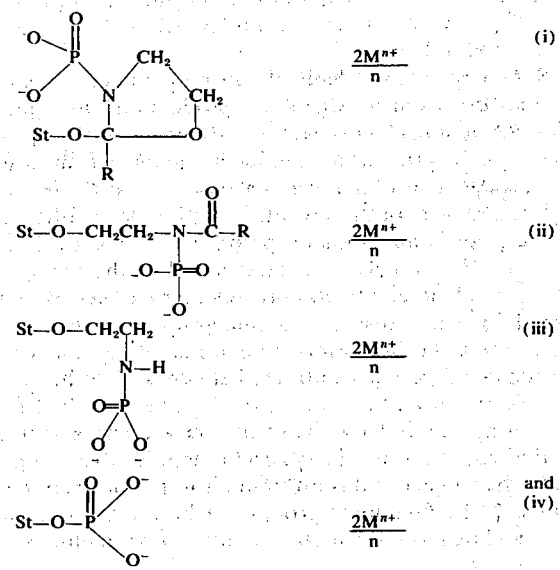

wherein St—O— represents the starch molecule in which a hydrogen of a hydroxyl group of an anhydroglucose unit has been replaced by a substituent group derived from the modifying agent, R represents an alkyl group containing 1 to 3 carbon atoms, M represents a cation, and $n$ represents the valence number of M. The practitioner will recognize that the starch molecule is a polymer which contains many anhydroglucose units, each (except the terminal groups) having three free hydroxyl groups which may react with the modifying agent. Therefore, the number of such displacements or the degree of substitution (D.S.) will vary with the particular starch, the ratio of the modifying agent to the starch, and, to some extent, the reaction conditions. Furthermore, since it is known that the relative reactivity of each of the hydroxyl groups within the anhydroglucose unit is not equivalent, it is probable that some will be more reactive with the modifying agent than others.

In the practice of this invention it is preferred that preferably, the modifying step is carried out in aqueous media by (1) suspending about 100 parts of the starch base in about 125 – 150 parts of water containing 7 –

20 parts of the modifying agent; (2) agitating the mixture at a pH between 10.5 and 12 at a temperature of about 20°– 55° C. for at least 3 hours; and recovering the resultant anionic starch product by filtration, washing with water, and drying.

The degree of stabilization of the novel phosphoramidic starch derivatives disclosed herein depends on the reaction conditions and the amount of the particular modifying agent used. These novel starch derivatives are characterized by their ability to yield thick, high viscosity dispersions which are relatively clear, cohesive, and stable (do not gel). The nitrogen content of any particular starch derivative may be determined by comparing the amount of nitrogen contained in said derivative with that of the non-reacted starch base, as determined by the Kjeldahl method. The phosphorus content of any particular starch derivative may be determined colorimetrically (after combustion) based on the formation of reduced heteropoly-phosphomolybdic acid (molybdenum blue).

The analytical data indicates that the phosphorus to nitrogen molar ratio is about one, which is consistent with the structures (i), (ii), or (iii). Small amounts of structure (iv) may be formed by the reaction of starch and structure (I), analogous to the reactions disclosed in U.S. Pat. No. 3,838,149.

The extent of the stabilization of the starch products may be estimated by various known methods such as for example, by a cook test as described hereinafter, by nitrogen analysis (i.e. measuring the difference in nitrogen contents of the particular starch product prior to and subsequent to the reaction, using the Kejldahl procedure); or by phosphorus analysis.

If desired, the phosphoramidic starch products of this invention may also be prepared by means of a dry process. In carrying out a typical dry procedure, the modifying agent is added to an aqueous slurry of the starch base. The pH of the resulting mixture is adjusted to between 8.0 and 12.0. The mixture is stirred, and the thusly treated starch is recovered by filtration and then dried to a moisture content of about 35% by weight or less, by any suitable conventional method. The dried treated starch is thereafter heated (as by placing in oven) at temperatures of about 35° to 100° C. (95° – 212° F.). The reaction period, i.e., heating time, will vary according to the particular modifying agent employed, the selected starch base, etc. Reaction periods ranging of about 1 – 6 hours have been found to be sufficient in most instances. At the end of the reaction period, the treated starch is allowed to cool. If removal of any residual salts and organic by-products is desired, the starch is then slurried in water, the slurry of the pH is adjusted to about 3 – and the starch product is recovered from the slurry by filtration, washing, and isolation as previously described.

It is thus seen that the novel process of this invention enables the practitioner to effectively prepare modified starches which are stabilized by anionic, phosphoramidic groups. Because of their unique properties, the novel products of this invention can be utilized in many industrial applications such as those employing suspending agents, thickeners, sizings, adhesives, etc.

The following examples further illustrate the preferred embodiments of this invention. In these examples, all parts are by weight, unless specified otherwise.

EXAMPLE I

This example illustrates the synthesis of the sodium salt of 2-methyl-3-phosphoryl-2-oxazolinium chloride and the usefulness of the salt in the preparation of a modified starch in accordance with the method of this invention.

Part I — Preparation of the Modifying Agent

To a solution of 3.0 grams of 2-methyl-2-oxazoline in 27.0 grams of water, there were slowly added, over approximately 20 minutes, 6.0 grams of phosphorus oxychloride. The temperature of the solution was maintained at about 5° C., and the pH of the solution was adjusted to and maintained between 11 – 12 by the periodic addition of 15% aqueous sodium hydroxide (a total of 61.6 grams of 15% sodium hydroxide was required). After the pH became constant at about 11.5 (approximately 20 minutes after the addition of the phosphorus oxychloride), the cooling bath was removed, and the temperature was then increased to and maintained at about 23° C. for an additional 2 hours as the solution was stirred. The sodium salt of 2-methyl-3-phosphoryl-2-oxazolinium chloride contained in the resulting solution was then utilized, as is, to modify a starch base as described below.

Part II — Preparation of the Starch Derivative:

The aqueous solution of the 2-methyl-3-phosphoryl-2-oxazolinium chloride described above was slowly admixed with a suspension consisting of 90.0 parts of corn starch and 120 parts of water. The pH of the resulting mixture was adjusted to 11.4 by the addition of 3.0% aqueous sodium hydroxide solution. The modifying agent and the corn starch were then reacted by agitating the mixture at about 40° C. for 16 hours. The reaction mixture was cooled to about 25° C. and the pH lowered from 11.3 to 6.0 with 10% aqueous hydrochloric acid. The starch product was then recovered by filtration, washed three times with water, and air dried. It was determined by analysis that the starch product contained 0.22% phosphorus, by weight. The analytical method consists of combusting the starch in an oxygen-filled Schoniger flask to convert all phosphorus into orthophosphate. The amount of orthophosphate is then determined colorimetrically based on the formation of reduced heteropoly-phosphomolybdic acid (molybdenum blue).

A suspension comprising 8 parts of the starch product and 96 parts of water and having a pH of 7.0 was cooked by means of a boiling water bath at 100° C. for 20 minutes. Upon cooling to about 23° C. and standing for 20 hours, it was observed that the resulting dispersion had significant stability and clarity when compared to an untreated corn starch control.

EXAMPLE II

This example illustrates the synthesis of the sodium salt of 2-ethyl-3-phosphoryl-2-oxazolinium chloride and the usefulness of the salt in the preparation of a modified starch in accordance with the method of this invention. This example also illustrates the stability characteristics of the starch derivatives disclosed herein.

The modifying agent was prepared by repeating the procedural steps outlined in Part I of Example I, using 3.5 grams of 2-ethyl-2-oxazoline, in lieu of the 2-methyl-2-oxazoline. A total of 63.7 grams of a 15% aqueous sodium hydroxide solution added over a period of 25 minutes was required to maintain the pH between 11 and 12. The reaction mixture was stirred for 1.5 hours after the cooling bath was removed.

The starch derivative was prepared by agitating a mixture of the solution of the sodium salt of the 2-ethyl-3-phosphoryl-2-oxazolinim chloride described above and a slurry comprised of 80 grams of corn starch in 100 grams of water at about 22° C. and a pH of 11.0 for 17 hours. The resulting starch product was filtered, washed, dried, and analyzed for its phosphorus content in the manners respectively described in Part II of Example I. This phosphoramidic starch derivative was found to have a phosphorus content comparable to that of Example I.

In order to evaluate the stability properties of the above described starch derivative, a portion thereof was subjected to a conventional cook test as described in Part II of Example I. Upon cooling to about 20° C and standing for 24 hours, the resulting dispersion was considerably clearer, more viscous, and much moe stable (non-gelling) than a similarly processed dispersion of a non-modified corn starch control.

EXAMPLE III

This example illustrates the preparations of additional starch derivatives in accordance with this invention, using varied starch bases.

A sufficient quantity of the modifying agent was first prepared by reacting 40.0 grams of phosphorus oxychloride with 20.0 grams of 2-methyl-2-oxazoline dissolved in 180 grams of water in the manner set forth in Part I of Example I. A total of 382.3 grams of the 15% aqueous sodium hydroxide solution was required to maintain a pH between 11 and 12. Portions of the resulting 622.3 grams of the sodium salt of 2-methyl-3-phosphoryl-2-oxazolinium chloride solution were then utilized to modify five varied starch bases as follows:

Into each of five beakers, A-E, containing a suspension comprised of 100 grams of a particular starch in 150 grams of water was introduced an amount of the above described reagent solution. In each case, an arbitrarily selected amount of the reagent solution was employed to modify the particular starch base in a manner similar to that outlined in Part II of Example I. The respective starch bases, each corresponding to a designated beaker, were as follows:

A. High amylose corn starch containing 50% by weight amylose.
B. Waxy maize starch which contained 5.5% by weight, dry basis, of propylene oxide (bound to starch) and was inhibited with 0.024% epichlorohydrin. The resulting starch base contained bis-1,3-glyceryl ether groups.
C. Tapioca starch.
D. Corn starch which contained 0.31% by weight, dry basis, of nitrogen obtained by treating the starch with 4.0% diethylaminoethylchloride hydrochloride. The resulting starch base contained diethylaminoethyl groups.
E. Corn starch which contained 0.29% by weight, dry basis, of nitrogen obtained by treating the starch base with the reaction product of epichlorohydrin and trimethylamine, as described in Example IV of U.S. Patent No. 2,876,217. The resulting starch base contained 3-(trimethyl ammonium chloride)-2-hydroxypropyl ether groups.

Each reaction was carried out over a period of 16 hours, and the starch products were processed, recovered, and analyzed for phosphorus content as described in Example I. The specific reaction conditions, the amount of reagent solution utilized, and the determined amount of phosphorus in each sample product are presented below in Table 1.

Table 1

| Starch | Reaction pH | Reaction Temp. | Reagent Solution (grams) | % Phosphorus |
|---|---|---|---|---|
| A | 10.5 | 22°C | 124.5 | 0.18 |
| B | 10.5 | 22°C | 77.8 | 0.08 |
| C | 10.5 | 22°C | 108.9 | 0.18 |
| D | 10.0 | 40°C | 93.3 | 0.26 |
| E | 10.5 | 40°C | 93.3 | 0.20 |

The data summarized above clearly shows that various starch bases may be utilized in the practice of this invention.

EXAMPLE IV

This example illustrates the preparations of additional derivatives, in accordance with this invention, under varied reaction conditions.

Variations of pH levels — Aqueous solutions of the sodium salt of 2-methyl-3-phosphoryl-2-oxazolinium chloride prepared according to Part I of Example I were utilized to prepare five starch derivative samples, F-J. In each case, the reaction was carried out by the method outlined in Part II of Example I, except that the starch suspension consisted of 100 parts of corn starch in 125 parts of water, and the pH level was varied. The pH during each reaction was maintained constant by periodically adding 3% sodium hydroxide as required. The resulting starch products were processed, recovered, and analyzed for phosphorus content as described in Part II of example I, and nitrogen by the Kjeldahl method. The base corn starch was found to contain 0.06% nitrogen. The pH level at which each of said samples were prepared and the respective phosphorus and nitrogen analyses are as follows:

| Sample | pH Level | % Phosphorus | % Nitrogen | Phosphorus/Nitrogen Molar Ratio |
|---|---|---|---|---|
| F | 11.4 | 0.205 | 0.145 | 1.09 |
| G | 11.0 | 0.205 | 0.134 | 1.25 |
| H | 10.5 | 0.252 | 0.166 | 1.07 |
| I | 10.0 | 0.196 | 0.144 | 1.05 |
| J | 9.0 | 0.06 | — | — |

The nitrogen content of the base starch was subtracted from the nitrogen content of the reaction product before calculating the phosphorus/nitrogen molar ratio.

Variation of Reaction Time — Equal quantities of the above aqueous solutions were used to modify three samples of the same corn starch in the manner set forth in Part II of Example I, except the reactions were carried out over varied periods of 1, 3, and 6 hours, at a controlled pH of 10.8. Upon being analyzed by the colorimetric method described above, the resulting starch derivatives were found to contain respectively 0.08, 0.20, and 0.18 per cent of phosphorus.

Variation of Reaction Temperature — Two corn starch derivatives were prepared by the method set forth in Part II of Example I, except the reactions were carried out at 22° and 52° C., respectively, at a controlled pH of 10.8, and 33% more reagent solution was used in each case. Upon being analyzed by the procedure described above, the starch product prepared at the lower temperature was found to contain 0.24% phosphorus and the other, 0.27%.

EXAMPLE V

This example illustrates the preparations of starch derivatives, using gelatinized starch bases.

A. A total of 20 parts of waxy maize which has been acid converted to a degree known in the trade as 85 fluidity was added to 60 parts of water. The resulting suspension was heated to and maintained at a temperature of about 100° C. for approximately 20 minutes, by means of a boiling water bath, and then cooled to about 23° C., whereupon 74 parts of an aqueuos modifier solution, the modified prepared as described in Part I of Example I, were added. The reaction mixture was stirred at 23° C. for 6 hours at a controlled pH of 10.5. Thereafter the pH was lowered to 6.0 by the addition of aqueous hydrochloric acid. The thusly prepared starch derivative was purified by dialysis in distilled water and then isolated by precipitation from alcohol. Upon being analyzed by the colorimetric method described hereinabove, this starch derivative was found to contain 0.31% phosphorus.

B. Experiment A was repeated using a reaction temperature of 90°C., the resulting starch derivative being found to contain 0.32% phosphorus.

EXAMPLE VI

This example illustrates the preparation of a starch derivative in accordance with this invention, using calcium hydroxide at a high pH. This example also illustrates the stability characteristics of the starch derivatives disclosed herein.

To a slurry consisting of 40 parts of corn starch and 1 part of calcium hydroxide in 50 parts of water, there were added 95 parts of an aqueous modifier solution as described in Part I of Example I. The resulting slurry was stirred under ambient conditions for 16 hours. The pH was then lowered from 12.0 to 3.0 with 10% aqueous hydrochloric acid and the starch product recovered by filtration, washed three times with water and dried. Upon analysis, this phosphoramidic starch derivative was found to contain 0.46% by weight of phosphorus. The starch derivative was clear, very viscous, and stable when tested by the method set forth in Example II.

EXAMPLE VII

This example illustrates the preparation of a starch derivative in accordance with this invention, using a relatively high amount of modifying agent.

A modifying agent was prepared by slowly adding 20 grams of phosphorus oxychloride to 10 grams of 2-methyl-2-oxazoline in 90 parts of water while the pH was maintained between 11 and 12 (by the addition of sodium hydroxide solution as called for) and the temperature was maintained at about 5° C. The addition of the phosphorus oxychloride was made over a period of 50 minutes, and the solution was then stirred for an additional 1 hour at about 22° C. A total of 191.2 grams of a 12.4% aqueous sodium hydroxide solution was required to control the pH between 11 and 12.

To make the modified starch, 30 grams of corn starch were added to the above described aqueous solution of the sodium salt of 2-methyl-3-phosphoryl-2-oxazolinium chloride. The resulting mixture was agitated at about 23° C. for 6 hours. The pH was adjusted to 6.0 by the addition of 10% aqueous hydrochloric acid, and the starch product recovered by filtration, washed three times with water, and dried. Upon analyses, it was determined that the starch product contained 0.44% by weight phosphorus, and 0.26% by weight of nitrogen as determined by the Kjeldahl method.

EXAMPLE VIII

This example illustrates the preparations of stabilized starch products by means of a dry process.

A total of 200 parts of corn starch was added to 622 parts of the aqueous modifier solution prepared as described in Example I. The pH was adjusted to 10.0, the slurry stirred for about 10 minutes, and the starch recovered by filtration. The starch was air dried to about 35% moisture and divided into two equal portions. One portion was heated in an oven at 40° C. for two hours, while the second portion was heated in an oven at 70° C. for two hours. The starches were then cooled, suspended in about 200 parts water, and the pH lowered to 6.0 with 3:1 aqueous hydrochloric acid. The starch products were recovered by filtration, washed three times with water and dried. The starch product prepared at 40° C. was found to contain 0.17% by weight of phosphorus and that prepared at 70° C. 0.18% by weight of phosphorus. Furthermore, portions of the two starch products described herein exhibited excellent stability properties, when subjected to the cook test described in Part II of Example I.

Summarizing, this invention provides a novel method for the preparation of phosphoramidic starch products, as well as a novel modifying agent which is useful in the preparation of such starch products. Moreover, this invention provides an efficient means for chemically altering the paste properties of starch.

Variations may be made in proportions, procedures and materials without departing from the spirit and scope of this invention which is limited only by the following claims.

What is claimed is:

1. A method for preparation of modified starch products comprising the steps of:
   a. reacting a starch base with about 3–125%, by weight of the starch base, of a salt of the reaction product of a 2-alkyl-2-oxazoline, wherein the alkyl group contains from 1 to 3 carbon atoms, and phosphorous oxychloride, and
   b. isolating the resulting starch product; wherein said reaction with the starch base is conducted in an aqueous medium at a temperature of about 15–95°C. for a period of about 1–24 hours at a pH level of about 9.0–13.0.

2. The method of claim 1, wherein said salt is a sodium salt, and sail alkyl group is a methyl group.

3. The method of claim 1, wherein said salt is a sodium salt, and said alkyl group is an ethyl group.

4. The method of claim 1, wherein said starch base is a gelatinized starch.

5. The method of claim 1, wherein said starch base is a granular starch.

6. The method of claim 1, wherein said starch base contains amine substituent groups.

7. The method of claim 1, wherein said starch base contains cationic substituent groups.

8. The method of claim 1, wherein said starch base contains diethyl aminoethyl groups.

9. The method of claim 1, wherein said starch base contains 3-(trimethylammonium chloride)-2-hydroxypropyl ether groups.

10. A modified starch product stabilized by anionic phosphoramidic groups comprising derivatives of a salt of the reaction product of a 2-alkyl-2-oxazoline, wherein the alkyl groups contain 1 to 3 carbon atoms, and phosphorus oxychloride.

11. A method for the preparation of modified starch products comprising the steps of:
 a. reacting a starch base with 3–125%, by weight of the starch base, of a salt of the reaction product of a 2-alkyl-2-oxazoline, wherein the alkyl group contains from 1 to 3 carbon atoms, and phosphorous oxychloride, and
 b. isolating the resulting starch product; wherein said reaction with the starch base is conducted in a substantially dry reaction medium at a temperature of about 35° to 100°C. for a period of 1 to 6 hours at a pH level of 8.0 to 12.0.

* * * * *